United States Patent
Gil et al.

(10) Patent No.: US 8,917,420 B2
(45) Date of Patent: Dec. 23, 2014

(54) METHOD AND SYSTEM FOR OPTIMIZING BLACK POINT COMPENSATION PARAMETERS

(71) Applicant: Xerox Corporation, Norwalk, CT (US)

(72) Inventors: Alvaro E. Gil, Rochester, NY (US); Himanshu J. Madhu, Webster, NY (US); Lina Fu, Fairport, NY (US); James M. Sanchez, Rochester, NY (US); Connie F. Purdum, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 127 days.

(21) Appl. No.: 13/667,994

(22) Filed: Nov. 2, 2012

(65) Prior Publication Data
US 2014/0126002 A1    May 8, 2014

(51) Int. Cl.
- H04N 1/60 (2006.01)
- G03F 3/08 (2006.01)
- G06K 9/00 (2006.01)

(52) U.S. Cl.
USPC ............ 358/1.9; 358/529; 358/518; 382/167

(58) Field of Classification Search
None
See application file for complete search history.

(56) References Cited

U.S. PATENT DOCUMENTS

| | | | |
|---|---|---|---|
| 7,755,796 B1 * | 7/2010 | Phillips et al. | 358/1.9 |
| 8,417,135 B2 * | 4/2013 | Mestha et al. | 399/56 |
| 2005/0151993 A1 * | 7/2005 | Gartstein et al. | 358/1.15 |
| 2007/0188780 A1 * | 8/2007 | Edge | 358/1.9 |
| 2008/0088857 A1 * | 4/2008 | Zimmer et al. | 358/1.6 |
| 2008/0089580 A1 * | 4/2008 | Marcu | 382/162 |
| 2008/0298677 A1 * | 12/2008 | Hayase | 382/162 |
| 2009/0002783 A1 * | 1/2009 | Hashii et al. | 358/520 |
| 2009/0274370 A1 * | 11/2009 | Sakamoto et al. | 382/190 |
| 2009/0323826 A1 * | 12/2009 | Wu et al. | 375/240.27 |
| 2010/0259794 A1 | 10/2010 | Purdum et al. | |
| 2010/0271505 A1 * | 10/2010 | Zimmer et al. | 348/231.2 |
| 2010/0290797 A1 * | 11/2010 | Mestha et al. | 399/38 |
| 2010/0302562 A1 * | 12/2010 | Bonnier et al. | 358/1.9 |
| 2011/0019212 A1 | 1/2011 | Wang et al. | |
| 2011/0317915 A1 * | 12/2011 | Gil | 382/167 |
| 2013/0088729 A1 * | 4/2013 | Fu et al. | 358/1.9 |
| 2014/0126003 A1 * | 5/2014 | Maltz et al. | 358/1.9 |

* cited by examiner

*Primary Examiner* — Madelein A Nguyen (74) *Attorney, Agent, or Firm* — Pillsbury Winthrop Shaw Pittman, LLP (57) ABSTRACT

A method for processing black point compensation parameters for a color image to be printed so as to enhance image quality of the color image is provided. The method includes converting a received color image to a gray scale image; determining, using the received color image and the gray scale image, a performance attribute to estimate the effect of the black point compensation parameters on the image quality of the received color image, respectively; deriving a model to estimate relationships between the black point compensation parameters and the determined performance attribute; maximizing the performance attribute of the derived model so as to process the black point compensation parameters for the color image; and using the processed black point compensation parameters to construct output device profiles.

18 Claims, 7 Drawing Sheets

METHOD AND SYSTEM FOR OPTIMIZING BLACK POINT COMPENSATION PARAMETERS

REFERENCE TO AN APPENDIX

This application includes an Appendix A, which is a hard copy print out of "Multivariate Adaptive Regression Splines," by Friedman, J. H. published in 1991 in Annals of Statistics 19 (1), pages 1-78 and its related discussion, consisting of 158 pages; an Appendix B, which is a hard copy print out of "Descriptive Sampling: An Improvement Over Latin Hypercube Sampling," by Eduardo Saliby published in Proceedings of the 29th Conference on Winter Simulation, pages 230-233, IEEE Computer Society Washington, D.C., 1997 consisting of 4 pages; and an Appendix C, which is a hard copy print out of "Survey of Multi-Objective Optimization Methods For Engineering," by R. T. Marler and J. S. Arora published in 2004 in Structural and Multidisc Optimization 36, pages 369-395, consisting of 27 pages. The material in these Appendices is incorporated by reference herein.

BACKGROUND

1. Field

The present disclosure relates to a system and a method for optimizing black point compensation parameters.

2. Description of Related Art

Generally, the black point compensation (BPC) function or algorithm is used for RGB images to retain shadow details in images because many images contain colors that are darker than the darkest color a printer can make. Without black point compensation, details in these shadow regions may be lost. These details may contain information the viewer knows should be there (such as, for example, the folds of a dark coat, the strands of dark hair, etc). Their absence when printed may be displeasing for a particular user.

Previous disclosures where BPC has been used have focused on parametric BPC algorithms for increasing shadow details and/or gloss reduction using look-up tables, for image dependent applications, for piece-wise multi-axis algorithms and for printing operations using multiple printing apparatus to output what is to be considered a single print job. None of these above-discussed approaches offers a process to optimize the BPC parameters so that the BPC parameters have to be manually tuned.

BPC algorithms are generally used to closely reproduce shadow details contained on images. Unfortunately, there are some cases where there is a trade-off among shadow details, highlight details, and color attributes. Therefore, the parameters in the BPC algorithm need to be tuned by means of a selection process that consists of a combination of (i) quantitative assessment, (ii) soft-proofing, and (iii) print comparison to a reference monitor system. Specifically, the general steps include generating of a set of International Color Consortium (ICC) profiles with several combinations of BPC parameters, soft-proofing images, printing images with the results obtained from the soft-proof, and selecting the BPC parameters by comparing the prints with a reference monitor. In this process, the parameters' optimization is often performed on a specific media. Therefore, robustness may be an issue in this process when other media types are used with the same parameters. Also, this process focuses on shadow details and not on how much the colors are being desaturated. Further, this process is completely manual and is very time consuming. Moreover, this process may be sub-optimal since it only considers a few combinations of the BPC parameters (i.e., depending on the number of chosen profiles).

One other approach that offers an automatic workflow, which aims at minimizing the resources used during the optimization of the BPC parameters, is provided. However, this approach only focuses on balancing both shadows details and color attributes by optimizing BPC parameters; however, the optimization process is applied offline and results in poor highlight details.

The present disclosure provides an automatic BPC parameter optimization process where the optimization process is applied online and an additional performance attribute is added to the optimization process, i.e., highlight details.

The black point compensation may generally include an input $L^*$ (input image data) to an output $L^*$ (image data to be rendered by the printer) mapping function that is used in a color management look-up table (LUT). This input $L^*$ to output $L^*$ mapping function is a parameterized quadratic or parabolic function which is used to modify the $L^*$ values of all the node colors in the multi-dimensional look-up table. The black point compensation is used as a single-valued scalar function.

The black point compensation function that retains the details in dark colors (e.g., hairs) includes two parameters: offset and slope, m. These two parameters are used to control the effects (i.e., retain darkness vs. details) in the color images.

For example, the BPC algorithm is generally implemented using the following Equation (1) for the dark region:

$$L_0^* = L_p^* + \text{offset} + m^* L_i^* + n^* L_i^{*2} \tag{1}$$

where $L_0^*$ is the $L^*$ output by the BPC algorithm (i.e., image data to be rendered by the printer);

$L_i^*$ are the $L^*$ values obtained from an image or a group of images to be rendered;

$L_p^*$ is the minimum $L^*$ value that the printer can produce;

offset is the first tunable parameter of the BPC algorithm and can be used to adjust for the known statistics of the input image (for example, if $L_i^*$ never goes to zero, it would waste dynamic range to map $L_i^* = 0$ to $L_p^*$);

m is the second tunable BPC parameter of the BPC algorithm or slope; and n is equal to the expression $$\frac{(1-m)^2}{4 * L_i^*}$$

which makes the $L_0^*$ curve become tangent to the identity curve ($L_0^* = L_i^*$) at the critical value $L_c^* = (1-m)/(2^*n)$.

For the light region ($L_i^*$ greater than $L_c^*$), the identity curve is used.

The second tunable parameter of the BPC algorithm, m is the slope of the BPC parabolic function. This parameter controls the shape of the parabola joining the identity part of the BPC curve (i.e., when $L_i = L_0^*$).

FIGS. 1A-1D provide relationships between $L_i^*$ and $L_0^*$ for different slope and offset parameter values. Specifically, FIGS. 1A-1D show the effects of the offset parameter value and slope parameter value, m on the $L_0^*$ (i.e., $L^*$ output by the BPC algorithm). Each of the graphs shown in FIGS. 1A-1D illustrates $L_i^*$ (i.e., the $L^*$ value that is input to the BPC algorithm) value on a horizontal x-axis. On a vertical y-axis, each of these graphs illustrates $L_0^*$ value. These curves were drawn for a printer with a $L_p^*$ value of about 12.

Figure 1A:
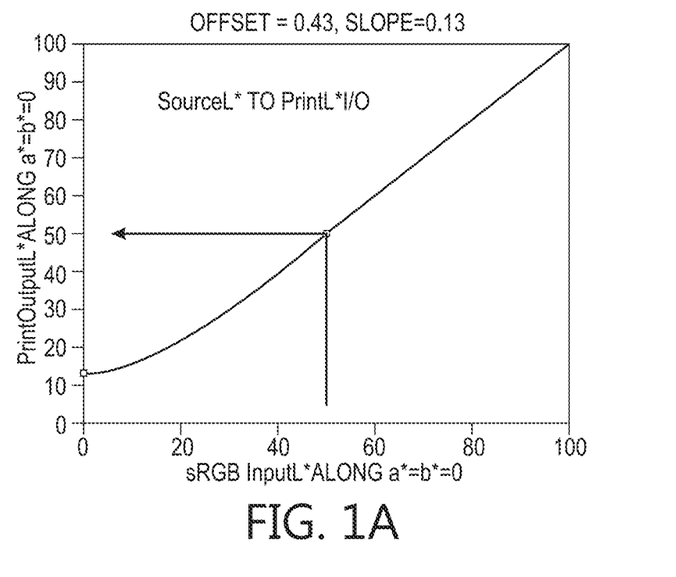
FIGS. 1A-1D show relationships between $L_i^*$ and $L_O^*$ for different slope and offset parameter values.

The graph in FIG. 1A illustrates the relationship between $L_i^*$ and $L_O^*$ for the offset parameter value of 0.43 and the slope parameter value of 0.13. The BPC curve in the graph in FIG. 1A has a quadratic behavior for the darker colors.

Figure 1B:
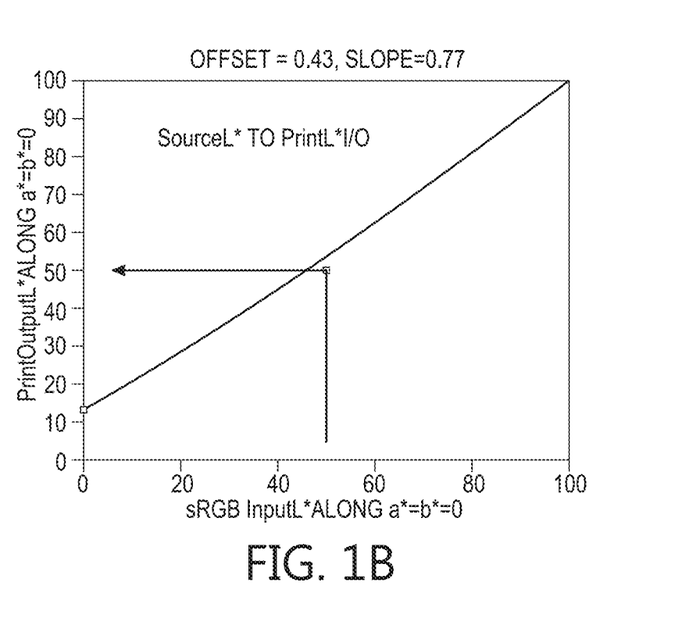

The graph in FIG. 1B illustrates the relationship between $L_i^*$ and $L_O^*$ for the offset parameter value of 0.43 and the slope parameter value of 0.77. The BPC curve in the graph in FIG. 1B has a more linear behavior. By comparing the graphs of FIGS. 1A and 1B, it can be realized that, as the slope parameter value is increased while keeping the offset parameter value constant, the quadratic behavior of the BPC curve changes into a linear behavior. Also, by increasing the slope parameter values, finer details may be obtained.

Figure 1C:
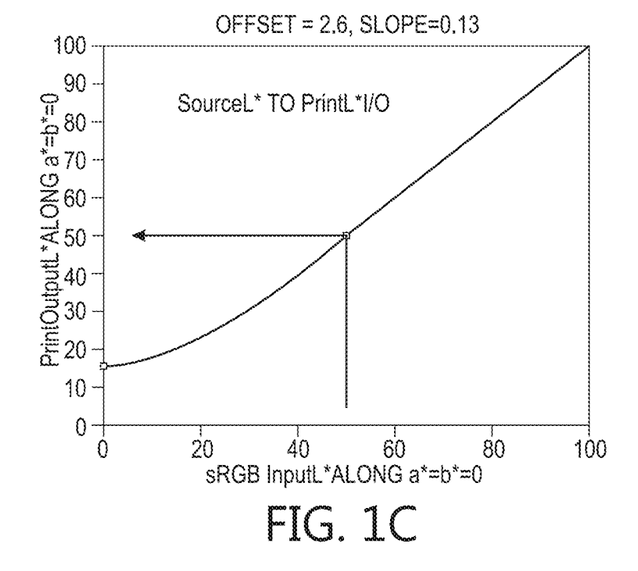

The graph in FIG. 1C illustrates the relationship between $L_i^*$ and $L_O^*$ for the offset parameter value of 2.6 and the slope parameter value of 0.13. The BPC curve in the graph in FIG. 1C has a quadratic behavior for the darker colors. By comparing the graphs of FIGS. 1A and 1C, it can be realized that the quadratic behavior of the BPC curves remains unchanged. However, an increase in the offset parameter value while the slope parameter value is maintained constant results in an increase in the darker $L_O^*$ values. For example, the minimum $L_O^*$ value for the graph in FIG. 1A is approximately 12, while the minimum $L_O^*$ value for the graph in FIG. 1C is approximately 14.6.

Figure 1D:
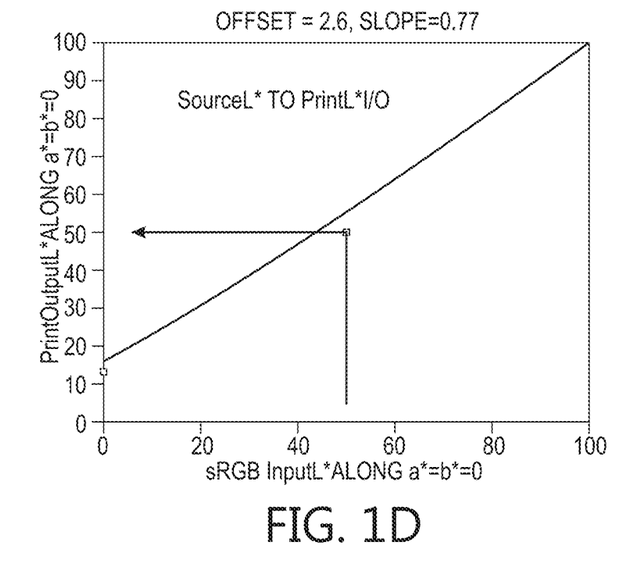

The graph in FIG. 1D illustrates the relationship between $L_i^*$ and $L_O^*$ for the offset parameter value of 2.6 and the slope parameter value of 0.77. The BPC curve in the graph in FIG. 1D has a more linear behavior. By comparing the graphs of FIGS. 1A and 1D, it can be noticed that the quadratic behavior of the BPC curves becomes linear as the slope parameter value is increased. Also, the increase in the offset parameter value results in an increase in $L_O^*$ values. For example, the minimum $L^*$ value for the graph in FIG. 1A is approximately 12, while the minimum $L^*$ value for the graph in FIG. 1D is approximately 16.24.

SUMMARY

In one embodiment, a method for processing black point compensation parameters for a color image to be printed so as to enhance image quality of the color image is provided. The method is implemented in a computer system comprising one or more processors configured to execute one or more computer program modules. The method includes receiving the color image and converting the color image to a gray scale image; determining, using the received color image and the gray scale image, a performance attribute to estimate the effect of the black point compensation parameters on the image quality of the received color image; deriving a model to estimate relationships between the black point compensation parameters and the determined performance attribute; maximizing the performance attribute of the derived model so as to process the black point compensation parameters for the color image; and using the processed black point compensation parameters to construct output device profiles.

In another embodiment, a system for processing black point compensation parameters for a color image to be printed by an image printing system so as to enhance image quality of the color image is provided. The system includes a processor configured to: receive the color image and convert the color image to a gray scale image; determine, using the received color image and the gray scale image, a performance attribute to estimate the effect of the black point compensation parameters on the image quality of the received color image; derive a model to estimate relationships between the black point compensation parameters and the determined performance attribute; maximize the performance attribute of the derived model so as to process the black point compensation parameters for the color image; and construct output device profiles using the processed black point compensation parameters.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure proposes a method and a system for optimizing the BPC parameters of a color image. Specifically, an automation of the optimization process proposed in this disclosure includes (1) converting a received color image to a gray scale image, (2) obtaining a virtual sensor that relates the BPC parameters to the expected amount of shadow details, highlight details, and saturation of colors contained in the color image, (3) constructing a model using the virtual sensor data, and (4) performing optimization of the BPC parameters that simultaneously seeks to maximize the original content of the color image, in terms of shadow details, highlight details, and color attributes, when this color image is printed on a color printer. The constructed model estimates the relationship between the inputs (BPC parameters) and the outputs (shadow details, highlight details, and color attributes). The constructed model is used for running a multi-objective optimization program to determine the BPC parameters that should be used during the construction of the ICC profiles or output device profiles. The method of the present disclosure comprehends a full automation of all its process steps.

Figure 2:
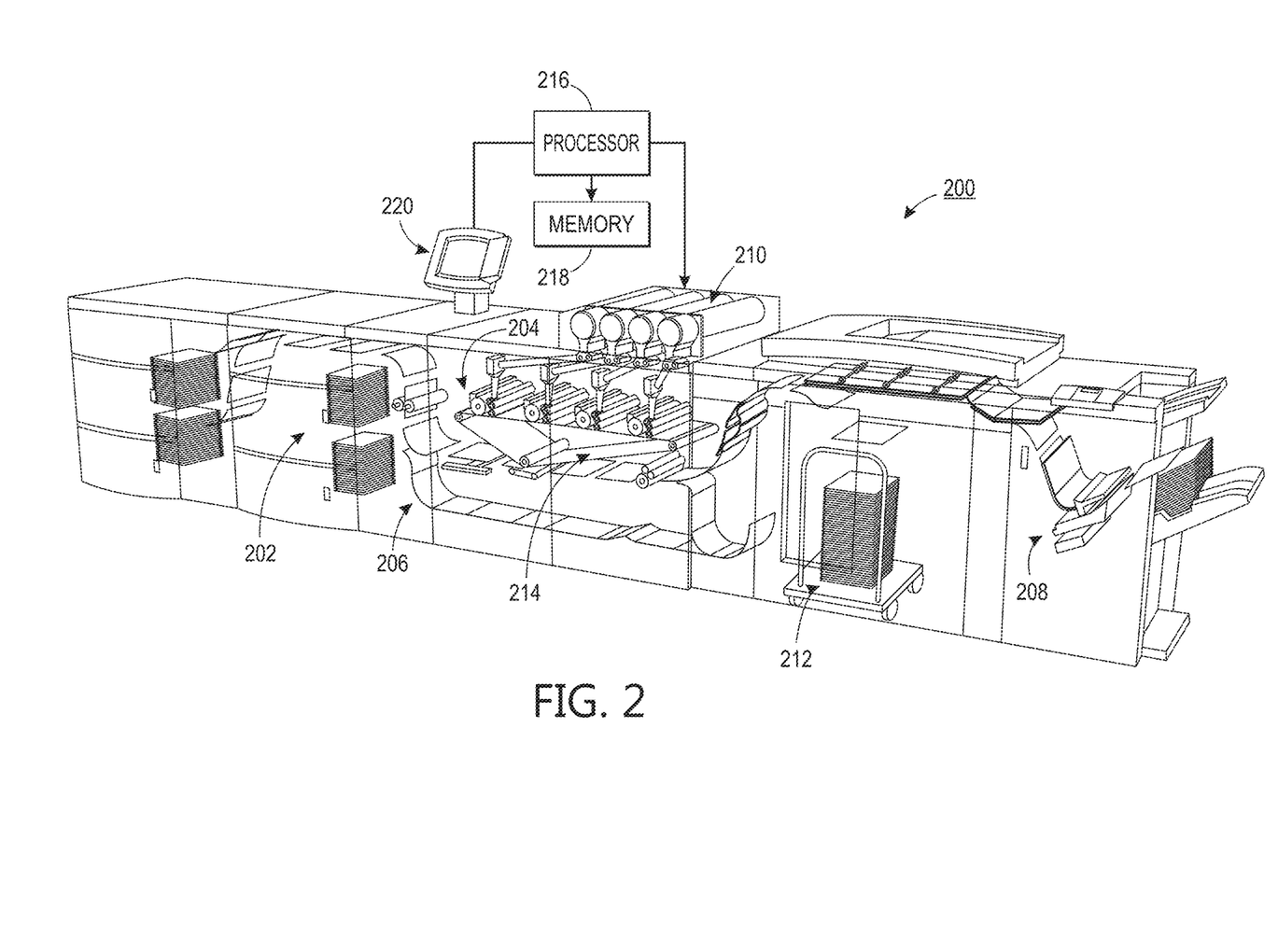
FIG. 2 shows an image printing system in accordance with an embodiment of the present disclosure.

FIG. 2 shows a schematic illustration of an image printing system 200, in accordance with an embodiment of the present disclosure. The system 200 is configured to optimize the BPC parameters in accordance with an embodiment of the present disclosure. The image printing system 200 generally includes one or more sources 202 of printable substrate media that are operatively connected to a print engine 204, an output path 206 and a finishing system 208. As illustrated, the print engine 204 may be a multi-color engine having a plurality of imaging/development subsystems 210 that are suitable for producing individual color images. A stacker device 212 may also be provided as known in the art.

The print engine 204 may mark xerographically; however, it will be appreciated that other marking technologies may be used, for example by ink jet marking, ionographically marking or the like.

In one implementation, the image printing system 200 may be a Digital Press. For example, the print engine 204 may render toner images of input image data on a photoreceptor belt (or drum) 214, where the belt 214 then transfers the images to the substrate.

A display device 220 may be provided to enable the user to control various aspects of the image printing system 200, in accordance with the embodiments disclosed therein. The system 200 includes a processor 216 that executes, and a memory 218 that stores, computer-executable instructions for carrying out the various procedures and performing the various functions described herein.

Figure 3:
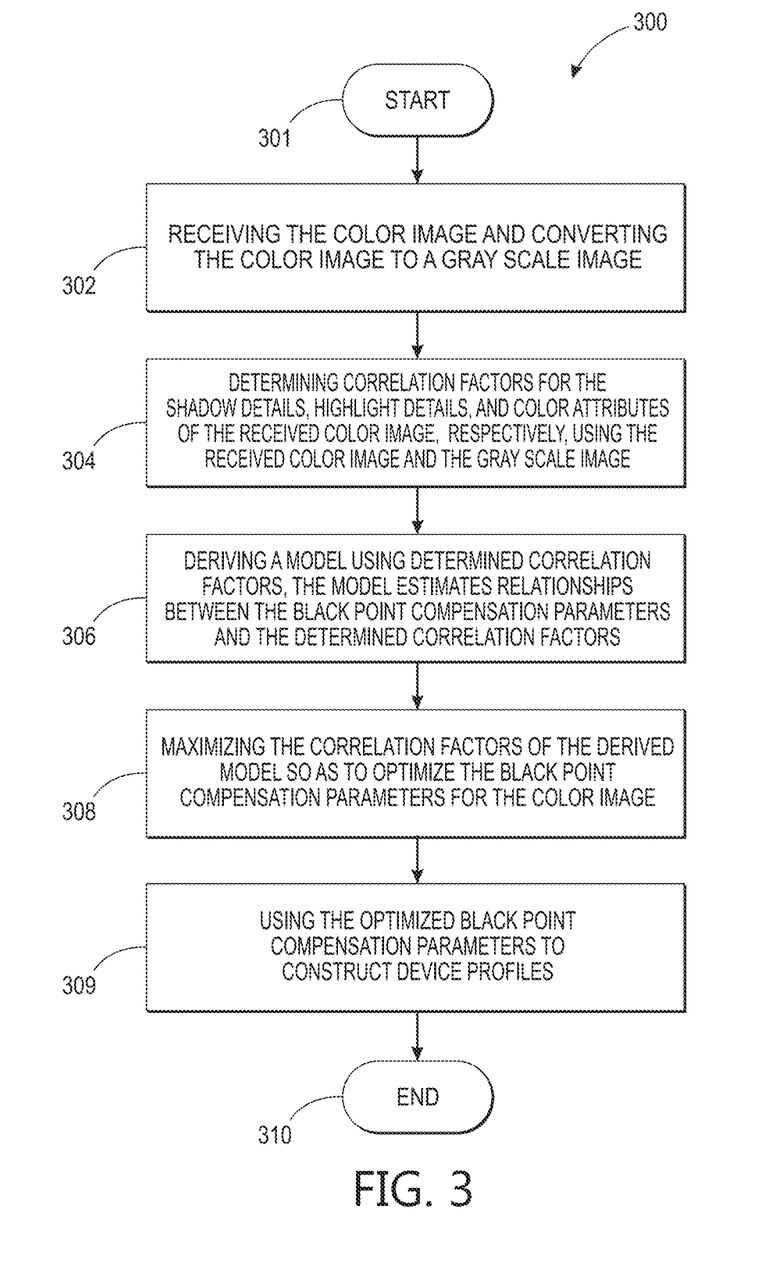
FIG. 3 shows a method for optimizing the BPC parameters of a color image in accordance with an embodiment of the present disclosure.

FIG. 3 shows a flowchart summarizing a method 300 for optimizing the BPC parameters in a color image. The method 300 is implemented in a computer system comprising one or more processors 216 configured to execute one or more computer program modules. The method 300 begins at procedure 301.

Referring to FIGS. 2 and 3, at procedure 302, a color image is received by the display device 220 and is sent to the processor 216 for further processing. Also, at procedure 302, the processor 216 is configured to convert the received color image into a gray scale image. The received color image is used to obtain color attributes information of the color image whereas the converted gray scale image is be used to obtain both shadow and highlight details information of the color image.

In one embodiment, the system 200 of the present disclosure is configured to optimize the BPC parameters for one or two received color images. In such an embodiment, the entire information of the received color image(s) is considered or used during the process of obtaining the optimized BPC parameters.

Figure 4:
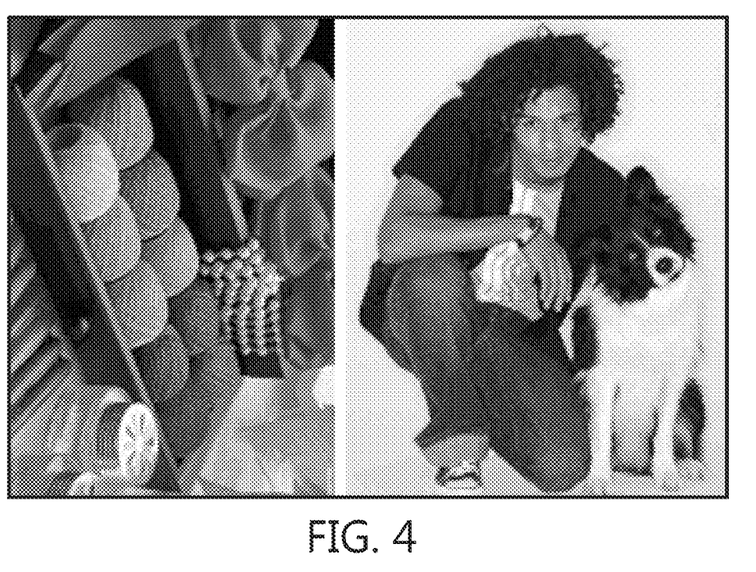
FIG. 4 shows two gray scale images corresponding to received color images, where the gray scale and color images provide highlight details, color attributes (color saturation), and shadow details information in accordance with an embodiment of the present disclosure.

For example, FIG. 4 shows two gray scale images that correspond to two received color images (not shown). That is, these two illustrated gray scale images are obtained when the received color images are converted to grayscale. Gray scale images shown in FIG. 4 provide the shadow information and highlight detail information that are used for optimizing the BPC parameters, while the received color images provide color attributes information that is used for optimizing the BPC parameters.

In another embodiment, the system 200 of the present disclosure is configured to optimize the BPC parameters for a set of color images. In such an embodiment, the set of color images are first converted into gray scale images. Several regions of interest can be extracted from the group of color images and gray scale images. These regions of interest include regions from which shadow detail information, highlight detail information, and/or color attribute information may be obtained.

Alternatively, when optimizing the BPC parameters for a set of color images, instead of converting the entire color images into gray scale images, first regions of interest can be extracted from the color images. Then just these extracted regions of interest from the set of color images are converted into gray scale.

In both these approaches, the obtained regions of interest, including both color images and gray scale image samples, are further processed to optimize the BPC parameters for the received set of color images.

Figure 5:
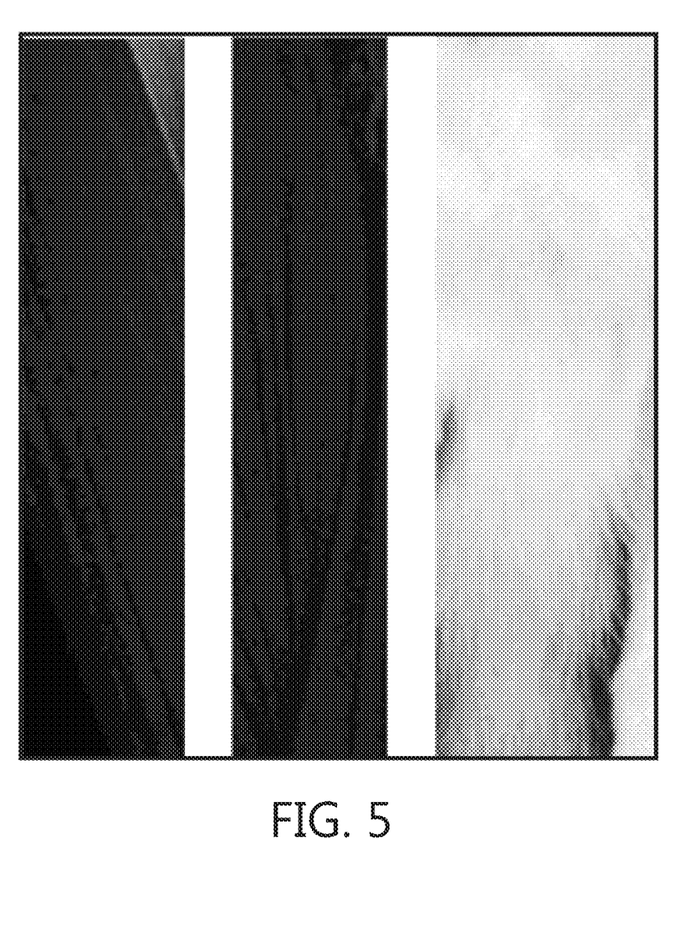
FIG. 5 shows gray scale image samples corresponding to received color image samples, where the gray scale and color image samples provide highlight details, color attributes (color saturation), and shadow details information in accordance with an embodiment of the present disclosure.

For example, FIG. 5 shows gray scale image samples that correspond to the received and/or extracted color image samples (not shown). That is, these illustrated gray scale image samples are obtained when the received and/or extracted color image samples are converted to grayscale. These color image samples are extracted from the received color images based on, for example, the color attributes, shadow details, and highlight details that will be optimized. When the BPC parameters for a number of received color images need to be optimized, the process may be time consuming. Also, the system may not have enough memory when loading all the color images in the received set. Therefore, the sample image approach is particularly useful when the BPC parameters for a number or a set of received color images need to be optimized.

Referring to FIG. 3, at procedure 304 of the method 300, the processor 216 is configured to determine, using the received color image and the gray scale image, a performance attribute to estimate the effect of the black point compensation parameters on the image quality of the received color image. The image quality of the received color image comprehends at least shadow details, highlight details and color attributes of the received color image.

The determining performance attribute includes: determining correlation factors for the shadow details, highlight details and color attributes of the received color image, respectively, using the received color image and the gray scale image. The correlation factors are configured to estimate the effect of the black point compensation parameters on the shadow details, highlight details and color attributes of the received color image, respectively.

That is, there is a need to quantify how the BPC parameters affect shadow details, highlight details, and color attributes of the received color images. A value of the correlation factor is used for this purpose. The correlation factors provide correlation between the original values contained in a color image or a group of color images and the modified values when the original values are passed through an ICC profile or output device profile. The values of the correlation factors are numbers equal or greater than −1 and equal or less than 1. The more positive the correlation factor, the stronger the correlation between the input and output.

Shadow details of the color image may be quantified by absolute values of $\rho_{sh}$ as shown in Equation (2).

$$\rho_{sh} = \frac{E[(H_o - \overline{H_o})(H_m - \overline{H_m})]}{(std(H_0) * std(H_m))} \quad (2)$$

where $\rho_{sh}$ is the shadow detail virtual sensor or shadow detail correlation factor;

E is the expected value;

$H_o$ are the original L* values in a color image or a group of color images;

$\overline{H_o}$ is the average of the original L* values in a color image or a group of color images;

$H_m$ are the modified L* values in a color image or a group of color images after passing them through an ICC profile;

$\overline{H_m}$ is the average of the modified L* values after passing them through an ICC profile; and std is the standard deviation.

Highlight details of the color image may be quantified by absolute values of $\rho_g$ as shown in Equation (3).

$$\rho_g = \frac{E[(G_o - \overline{G_o})(G_m - \overline{G_m})]}{(std(G_o) * std(G_m))} \quad (3)$$

where $\rho_g$ is the highlight detail virtual sensor or highlight detail correlation factor;

E is the expected value;

$G_o$ are the original L* values in a color image or a group of color images;

$\overline{G_o}$ is the average of the original L* values in a color image or a group of color images;

$L_m$* are the values obtained after original L* values are passed through an ICC profile;

$\Delta L$* are the values computed by subtracting the $L_m$* obtained after passing the original L* through an ICC profile from the original L* from a color image or a group of color images;

$G_m$ are the $\Delta L$* values in a color image or a group of color images after passing them through an ICC profile;

$\overline{G_m}$ is the average of the $\Delta L$* values after passing them through an ICC profile; and std is the standard deviation.

Saturation of color may be quantified by the absolute values of $\rho_s$ as shown in Equation (4).

$$\rho_s = \frac{E[(S_o - \overline{S_o})(S_m - \overline{S_m})]}{(std(S_o) * std(S_m))} \quad (4)$$

where $\rho_s$ is the saturation of color virtual sensor or saturation of color correlation factor;

E is the expected value;

$S_o$ are the original saturation (chroma divided by lightness) values in a color image or a group of color images;

$\overline{S_o}$ is the average of the original saturation values in a color image or a group of color images;

$S_m$ are the modified saturation values in a color image or a group of color images after passing them through an ICC profile;

$\overline{S_m}$ is the average of the modified saturation values after passing them through an ICC profile; and std is the standard deviation.

In one embodiment, the color attribute may include saturation of colors. However, it is contemplated that the color attribute may include any other color attribute of the color image that is different from the saturation of colors. In another embodiment, the method and the system may include more than one color attribute.

In one embodiment, S may also be defined as the chroma of pixels contained in an image or any other variable of interest.

Referring to FIG. 3, at procedure 306 of the method 300, the processor 216 is configured to derive a model using the determined performance attribute. The model is configured to estimate relationships between the black point compensation parameters and the determined performance attribute. That is, the black point compensation parameters are the inputs and the determined performance attribute of interest are the outputs of this model. As noted above, the correlation factors may include shadow details correlation factor, highlight details correlation factor and color attributes correlation factor.

The derivation of this model is useful for performing the optimization of the BPC parameters. For example, if the outputs (i.e., the correlation factors) are obtained for a few different input values (i.e., the offset parameter value and the slope parameter value) and no output information at other input values is known, then a model is first constructed using the obtained outputs and their corresponding inputs. The output information at any other desired input values can thus be obtained from this constructed model.

The model can be derived depending upon the type of optimization problem for which a solution is desired. For example, if it is desired to optimize the BPC parameters for a set of media, then the models for $\rho_{sh}$, $$\frac{1}{\rho_g},$$

and $\rho_s$ may be derived using a Design of Experiments (DOE) with an outer-array method. The DOE with the outer-array method is described in detail in "Design for Six Sigma: The tool guide for practitioners," by Lisa A. Reagan and Mark J. Kiemele, published by CTQ Media, Bainbridge Island, Wash., which herein is incorporated by reference in its entirety. The model derived using DOE provides robustness for a set of media of interest.

In one embodiment, the models for $\rho_{sh}$, $$\frac{1}{\rho_g},$$

and $\rho_s$ may be derived using a Design of Experiments (DOE) using a Multivariate Adaptive Regression Splines (MARS). The DOE using the Multivariate Adaptive Regression Splines (MARS) is described in detail at "Multivariate Adaptive Regression Splines," by Friedman, J. H. published in 1991 in Annals of Statistics 19 (1), pages 1-78, which is provided in the Appendix A filed along with this application herein is incorporated by reference in its entirety. It is contemplated, however, that other approaches may also be applied here. In one embodiment, the points used for deriving the MARS model were obtained using a descriptive sampling. For example, descriptive sampling is explained in detail in "Descriptive Sampling: An Improvement Over Latin Hypercube Sampling," by Eduardo Saliby published in Proceedings of the 29th Conference on Winter Simulation, pages 230-233, IEEE Computer Society Washington, D.C., 1997, which is provided in the Appendix B filed along with this application and herein is incorporated by reference in its entirety.

TABLE 1 below shows exemplary inputs and outputs of this DOE using the virtual sensors (i.e., $\rho_{sh}$, $\rho_g^{-1}$, and $\rho_s$) introduced above. The inputs in TABLE 1 are the BPC parameters, which include the offset parameter and the slope parameter. The offset parameter and the slope parameter are shown and described above with respect to the Equation (1). The outputs in TABLE 1 are defined as follows: shadow details correlation factor absolute values represented by $\rho_{sh}$, color saturation correlation factor absolute values represented by $\rho_s$, and highlight details correlation factor absolute values represented by $\rho_g^{-1}$.

TABLE 1

| Inputs (BPC Parameters) | | Outputs (Correlation Factors) | | |
|---|---|---|---|---|
| Offset | Slope | Shadow Details | Color Saturation | Highlight Details |
| 0.0600 | 0.234 | 0.9511 | 0.4892 | 2.5690 |
| 0.1800 | 0.8100 | 0.9989 | 0.6234 | 1.2269 |
| 0.3000 | 0.5220 | 0.9831 | 0.5639 | 2.5690 |
| 0.4200 | 0.2700 | 0.9586 | 0.4929 | 2.5690 |
| 0.5400 | 0.1260 | 0.9406 | 0.4921 | 2.5690 |
| 0.6600 | 0.7020 | 0.9960 | 0.6114 | 2.3623 |
| 0.7800 | 0.6300 | 0.9922 | 0.6100 | 2.5597 |
| 0.9000 | 0.1980 | 0.9471 | 0.4989 | 2.5690 |
| 1.0200 | 0.7380 | 0.9975 | 0.6311 | 1.5112 |
| 1.1400 | 0.0540 | 0.9288 | 0.4710 | 2.5690 |
| 1.2600 | 0.4140 | 0.9726 | 0.5926 | 2.5690 |
| 1.3800 | 0.5580 | 0.9875 | 0.6107 | 2.5685 |
| 1.5000 | 0.7740 | 0.9983 | 0.6513 | 1.2131 |
| 1.6200 | 0.3060 | 0.9596 | 0.5947 | 2.5690 |
| 1.7400 | .06660 | 0.9946 | 0.6408 | 2.4248 |
| 1.8600 | .08820 | 0.9992 | 0.6761 | 1.1636 |
| 1.9800 | 0.4500 | 039773 | 0.6135 | 2.5690 |
| 2.1000 | 0.3780 | 0.9690 | 0.6131 | 2.5690 |
| 2.2200 | 0.8460 | 0.9989 | 0.6697 | 1.1705 |
| 2.3400 | 0.5940 | 0.9901 | 0.6382 | 2.5527 |
| 2.4600 | 0.1620 | 0.9381 | 0.5937 | 2.5690 |
| 2.5800 | 0.0900 | 0.9268 | 0.5816 | 2.5690 |
| 2.7000 | 0.3420 | 0.9635 | 0.6260 | 2.5690 |
| 2.8200 | 0.0180 | 0.9144 | 0.5792 | 2.5690 |
| 2.9400 | 0.4860 | 0.9816 | 0.6511 | 2.5689 |

Referring to FIG. 3, at procedure 308 of the method 300, the processor 216 is configured to maximize the performance attribute or correlation factors of the derived model so as to optimize the black point compensation parameters for the color image.

The inputs (BPC parameters) are manipulated in such a way that the outputs (correlation factors) of the derived model are maximized. Mathematically, this can be formulated as: finding the value of x* that maximizes the function J(x). The function J(x) is defined by the Equation (5) below and x* is defined by Equation (6) below.

$$J(x)=[\rho_{sh}(\text{offset}^*,m^*),\rho_g^{-1}(\text{offset}^*,m^*),\ldots,\rho_s(\text{offset}^*,m^*)] \quad (5)$$

where
J(x) is a function that is to be maximized;
$\rho_{sh}(\text{offset}^*,m^*)$ is the shadow correlation factor or the shadow virtual sensor, the shadow correlation factor being a function of the offset parameter and slope parameter;
$\rho_g^{-1}(\text{offset}^*,m^*)$ is the highlights correlation factor or the highlights virtual sensor, the highlights correlation factor being a function of the offset parameter and slope parameter;
$\rho_s(\text{offset}^*,m^*)$ is the saturation correlation factor or the saturation virtual sensor, the saturation correlation factor being a function of the offset parameter and slope parameter.

$$x^*=(\text{offset}^*,m) \quad (6)$$

where
x*=the value that maximizes the function J(x);
offset*=the BPC parameter or the offset parameter value(s) that maximizes the outputs (correlation factors) of the derived model; and
m*=the BPC parameter or the slope parameter value(s) that maximizes the outputs (correlation factors) of the derived model.

In one embodiment, Multi-Objective Pareto Optimization technique is used to optimize the BPC parameters (i.e., the offset parameter and the slope parameter) such that the correlation coefficients (i.e., $\rho_{sh}$, $\rho_g^{-1}$, and $\rho_s$) are maximized. For example, Multi-Objective Pareto Optimization is described in detail at "Survey of Multi-Objective Optimization Methods For Engineering," by R. T. Marler and J. S. Arora published in 2004 in Structural and Multidisc Optimization 36, pages 369-395, which is provided in the Appendix C filed along with this application herein is incorporated by reference in its entirety.

Figure 6:
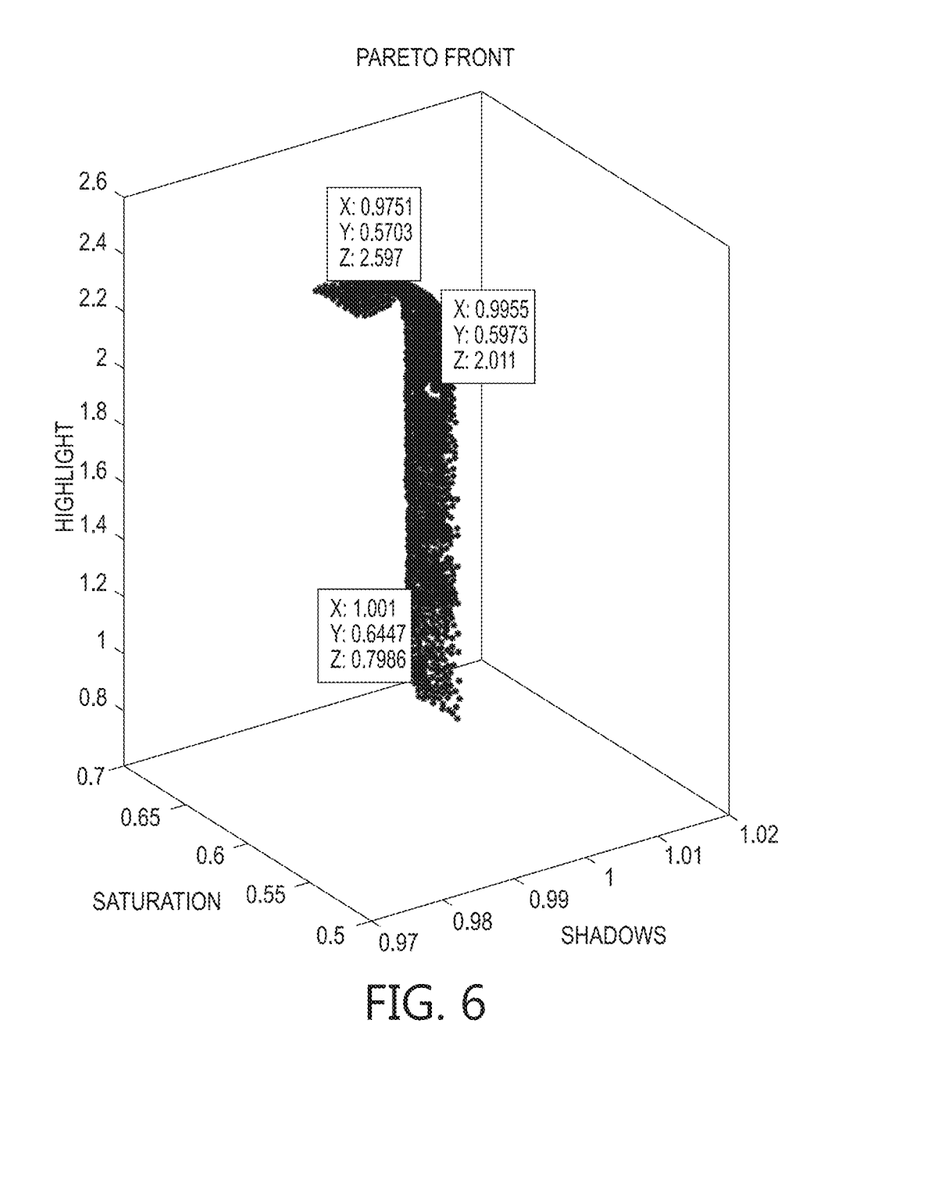
FIG. 6 shows a Multiple-Point Pareto Front Optimization that is used to optimize the BPC parameters in accordance with an embodiment of the present disclosure.

FIG. 6 provides Multiple-point Pareto Front. The graph shown in FIG. 6 illustrate shadow correlation factor on an x-axis. On a y-axis, the graph of FIG. 6 illustrates saturation correction factor and On a z-axis, the graph of FIG. 6 illustrates highlights correlation factor. The optimization of the BPC parameters is based on possible conflicting objectives using the Multi-objective Pareto Optimization.

Referring to FIG. 6, the Pareto Front obtained is a multiple point front where the three conditions ($\rho_{sh}$, $\rho_g^{-1}$, and $\rho_s$) are selected to satisfy certain preferences. A point is selected where all the conditions are satisfied by finding the minimum distance between a point that contains the maximum possible objective values and a point on the Pareto Front. In one embodiment, the optimized parameters output by this Multiple-point Pareto Front algorithm were at offset parameter value=0.96 and slope parameter value=0.66.

Different points on the Pareto Front may similarly be obtained by assigning weights on the objectives of more interest. One example is the weighted Euclidean distance, $$d = \sum_{i=1}^{n} w_i \left( \frac{J_i(\infty) - J_{user}(\infty)}{\overline{J_\varepsilon} - \underline{J_i}} \right), \; w_i \in (0,1), \; \sum w_i = 1,$$

where x contains the BPC parameter values associated to a point on the Pareto Front $J_{user}(x)$, is the point specified by the user, $\overline{J_c}$ is the maximum value of the $i^{th}$ performance attribute, $\underline{J_i}$ is the minimum value of the $i^{th}$ performance attribute, and $w_i$ is the weight for each $J_i$. A solution x* will be chosen by the value that minimizes the Euclidean distance d.

Referring back to FIGS. 2 and 3, the method includes a procedure 309 in which the processor 216 is configured to construct output device profiles using the optimized black point compensation parameters. The output device profiles are ICC profiles. The optimized black point compensation parameters are used to maximize the shadow details, highlight details and color attribute of the received image, when the received image is printed by an output device. The output device is an image printing system. The method ends at procedure 310.

The black point compensation (BPC) parameter tuning method proposed in the present disclosure is fully automatic. The goal of this automation process is to minimize the resources currently used for this task and yet maintain or surpass the quality of images currently obtained. The present disclosure proposes automating the tuning of black point compensation parameters for a specific set of images to be printed.

Thus, given a BPC compensation algorithm that maps an offset parameter and a slope parameter to an L* output and a set of images to be printed, the method of the present disclosure defines three metrics corresponding to shadow detail, highlight detail, and color attributes of a received color image. These metrics correspond to correlation coefficients for the relevant pixels before and after applying the BPC algorithm. A relationship is then defined between the offset parameter and the slope parameter to the defined metrics. An optimization procedure is then defined which enables the user to produce optimized values for the metrics by varying the offset and the slope parameters.

The automatic procedure suggests parameter BPC values using equal weight values for each performance attribute. We also want to offer the user the opportunity to put more emphasis on what has value for them. If they are interested on saturation more than anything else, then they can increase the weight value to that performance attribute and decrease the weights for the other two performance attributes. However, the method will still produce automatic BPC values for them. They could also select a point on the Pareto Front and the algorithm will return the optimized BPC parameters.

The method of the present disclosure also proposes optimization of the BPC parameters by taking into consideration not only shadow details, but also to color attributes and highlights details.

Wherever used herein, terms "optimizing" or "maximizing" shall be construed broadly, such as to show an improvement of performance among a given set of measurements or values in a given practical situation, and not necessarily to show a provable mathematical optimum or maximum.

Shadows are the dark colors contained in an image whereas highlights are the light bright colors in an image. Shadows/highlights details refer to the content of a set of dark/light colors present in an image. The loss of shadows/highlight in a printed image is the hidden details of the dark/light colors present in an original image. Color attributes can be represented by chroma, saturation, and any other terminology described in color theory. Chroma is the attribute of color used to indicate the degree of departure of the color from a gray of the same lightness. Saturation can be defined as chroma divided by lightness.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for processing black point compensation parameters for a color image to be printed so as to enhance image quality of the color image, the method is implemented in a computer system comprising one or more processors configured to execute one or more computer program modules, the method comprising:
    receiving the color image;
    determining, using the received color image, a performance attribute to estimate the effect of the black point compensation parameters on the image quality of the received color image,
    wherein the black point compensation parameters include a first tunable parameter and a second tunable parameter of a black point compensation algorithm, wherein the black point compensation algorithm is configured to map input color values for the received color image to an output data to be rendered by an output device,
    deriving a model to estimate relationships between the black point compensation parameters and the determined performance attribute;
    maximizing the determined performance attribute of the derived model so as to process the black point compensation parameters for the color image; and
    using the processed black point compensation parameters to construct output device profiles associated with the output device.

2. A method of claim 1, wherein the image quality of the received color image comprehends at least shadow details, highlight details and color attributes of the received color image.

3. A method of claim 2, wherein the performance attribute includes functions for at least the shadow details, the highlight details, and the color attributes of the received color image, wherein each function correlates an original value contained in the received color image and a modified value when the corresponding original value is passed through an output device profile, and
    the functions include:
        at least correlation factors for the shadow details, highlight details and color attributes of the received color image that are configured to estimate the effect of the black point compensation parameters on the shadow details, highlight details and color attributes of the received color image, respectively.

4. A method of claim 2, wherein the processed black point compensation parameters are used to maximize the shadow details, highlight details and color attribute of the received color image, when the received color image is printed by the output device.

5. A method of claim 2, wherein the color attributes of the color image include color saturation and chroma.

6. A method of claim 1, wherein the first tunable parameter is an offset value.

7. A method of claim 1, wherein the second tunable parameter is a slope of a black point compensation function.

8. The method of claim 1, further comprising converting the received color image to a gray scale image, wherein the gray scale image and the received color image are configured to provide information about the shadow details, the highlight details and the color attributes of the received color image.

9. A method for processing black point compensation parameters for a color image to be printed so as to enhance image quality of the color image, the method is implemented in a computer system comprising one or more processors configured to execute one or more computer program modules, the method comprising:
    receiving the color image and converting the color image to a gray scale image;
    determining, using the received color image and the gray scale image, a performance attribute to estimate the effect of the black point compensation parameters on the image quality of the received color image;
    deriving a model to estimate relationships between the black point compensation parameters and the determined performance attribute;
    maximizing the performance attribute of the derived model so as to process the black point compensation parameters for the color image; and
    using the processed black point compensation parameters to construct output device profiles,
    wherein the image quality of the received color image comprehends at least shadow details, highlight details and color attributes of the received color image, wherein the determining the performance attribute includes:
  determining correlation factors for the shadow details, highlight details and color attributes of the received color image, respectively, using the received color image and the gray scale image, wherein the correlation factors are configured to estimate the effect of the black point compensation parameters on the shadow details, highlight details and color attributes of the received color image, respectively, wherein the correlation factors of the derived model are maximized using a Multi-Objective Pareto Optimization procedure.

10. A system for processing black point compensation parameters for a color image to be printed by an image printing system so as to enhance image quality of the color image, the system comprising:
  a processor configured to:
    receive the color image;
    determine, using the received color image, a performance attribute to estimate the effect of the black point compensation parameters on the image quality of the received color image;
    wherein the black point compensation parameters include a first tunable parameter and a second tunable parameter of a black point compensation algorithm, wherein the black point compensation algorithm is configured to map input color values for the received color image to an output data to be rendered by an output device,
    derive a model to estimate relationships between the black point compensation parameters and the determined performance attribute;
    maximize the determined performance attribute of the derived model so as to process the black point compensation parameters for the color image; and
    construct output device profiles using the processed black point compensation parameters associated with the output device.

11. A system of claim 10, wherein the image quality of the received color image comprehends at least shadow details, highlight details and color attributes of the received color image.

12. A system of claim 11, wherein the color attributes of the color Image include color saturation and chroma.

13. A system of claim 11, wherein the performance attribute includes functions for at least the shadow details, the highlight details, and the color attributes of the received color image, wherein each function correlates an original value contained in the received color image and a modified value when the corresponding original value is passed through an output device profile, and wherein the functions include: at least correlation factors for the shadow details, highlight details and color attributes of the received color image, that are configured to estimate the effect of the black point compensation parameters on the shadow details, highlight details and color attributes of the received color image, respectively.

14. A system of claim 10, wherein the processor is further configured to use the processed black point compensation parameters so as to maximize the shadow details, highlight details and color attribute of the received color image, when the received color image is printed by the output device.

15. A system of claim 10, wherein the first tunable parameter is an offset value.

16. A system of claim 10, wherein the second tunable parameter is a slope of a black point compensation function.

17. The system of claim 10, wherein the processor is further configured to convert the received color image to a gray scale image, wherein the gray scale image and the received color image are configured to provide information about the shadow details, the highlight details and the color attributes of the received color image.

18. A system for processing black point compensation parameters for a color image to be printed by an image printing system so as to enhance image quality of the color image, the system comprising:
  a processor configured to:
    receive the color image and convert the color image to a gray scale image;
    determine, using the received color image and the gray scale image, a performance attribute to estimate the effect of the black point compensation parameters on the image quality of the received color image;
    derive a model to estimate relationships between the black point compensation parameters and the determined performance attribute;
    maximize the performance attribute of the derived model so as to process the black point compensation parameters for the color image; and
    construct output device profiles using the processed black point compensation parameters,
    wherein the image quality of the received color image comprehends at least shadow details, highlight details and color attributes of the received color image,
    wherein the processor configured to determine performance attribute includes: determining correlation factors for the shadow details, highlight details and color attributes of the received color image, respectively, using the received color image and the gray scale image, wherein the correlation factors are configured to estimate the effect of the black point compensation parameters on the shadow details, highlight details and color attributes of the received color image, respectively, wherein the correlation factors of the derived model are maximized using a Multi-Objective Pareto Optimization procedure.

* * * * *